United States Patent [19]

Rao et al.

[11] Patent Number: 5,307,772
[45] Date of Patent: May 3, 1994

[54] REDOX CATALYSIS OF $NO_x$ IN INTERNAL COMBUSTION ENGINES

[75] Inventors: Vemulapalli D. N. Rao, Bloomfield Hills; Harry A. Cikanek, Northville, both of Mich.

[73] Assignee: Ford Motor Company, Dearborn, Mich.

[21] Appl. No.: 991,227

[22] Filed: Dec. 16, 1992

[51] Int. Cl.⁵ .............................................. F02B 19/14
[52] U.S. Cl. ........................................ 123/272; 123/286
[58] Field of Search ................... 123/143 B, 270, 271, 123/272, 286, 670

[56] References Cited

U.S. PATENT DOCUMENTS

| | | | |
|---|---|---|---|
| Re. 30,426 | 11/1980 | Haslett | 123/143 B |
| 3,947,379 | 3/1976 | Feins | 252/463 |
| 4,031,185 | 6/1977 | Akimoto et al. | 423/239 |
| 4,131,432 | 12/1978 | Sato et al. | 422/177 |
| 4,140,654 | 2/1979 | Yoshioka et al. | 252/440 |
| 4,164,546 | 8/1979 | Welty, Jr. et al. | 423/239 |
| 4,182,745 | 1/1980 | Nishida et al. | 423/239 |
| 4,186,177 | 1/1980 | Shiga et al. | 423/239 |
| 4,188,365 | 2/1980 | Yoshioka et al. | 423/239 |
| 4,192,855 | 3/1980 | Ginger | 423/239 |
| 4,199,555 | 4/1980 | Itoh et al. | 423/239 |
| 4,267,155 | 5/1981 | Kobayashi et al. | 423/235 |
| 4,367,162 | 1/1983 | Fujitani et al. | 252/443 |
| 4,369,746 | 1/1983 | Thring | 123/272 X |
| 4,370,508 | 1/1983 | Kaeding | 585/467 |
| 4,393,830 | 7/1983 | Bodine | 123/272 |
| 4,425,884 | 1/1984 | Thring et al. | 123/272 |
| 4,438,082 | 3/1984 | Dettling et al. | 423/235 |
| 4,473,537 | 9/1984 | Ford, Jr. et al. | 423/239 |
| 4,477,584 | 10/1984 | Kaeding | 502/77 |
| 4,542,006 | 9/1985 | Voorhoeve | 423/365 |
| 4,585,632 | 4/1986 | Schneider et al. | 423/239 |
| 4,662,331 | 5/1987 | Ogawa et al. | 123/270 |
| 4,666,882 | 5/1987 | Okazaki et al. | 502/338 |
| 4,710,363 | 12/1987 | Fruhbuss | 423/239 |
| 4,719,094 | 1/1988 | Rieckert et al. | 423/239 |
| 4,744,962 | 5/1988 | Johnson et al. | 423/235 |
| 4,798,813 | 1/1989 | Kato et al. | 502/60 |
| 4,886,650 | 12/1989 | Perry | 423/235 |
| 4,966,873 | 10/1990 | Iida et al. | 502/84 |
| 4,973,399 | 11/1990 | Green et al. | 208/120 |
| 4,978,514 | 12/1990 | Hofmann et al. | 423/235 |

FOREIGN PATENT DOCUMENTS

| | | | |
|---|---|---|---|
| 2919743 | 11/1980 | Fed. Rep. of Germany | 123/272 |
| 58-217720 | 12/1983 | Japan | 123/272 |
| 59-46317 | 3/1984 | Japan | 123/270 |
| 60-17221 | 1/1985 | Japan | 123/272 |
| 2097856 | 11/1982 | United Kingdom | 123/272 |

OTHER PUBLICATIONS

"Complete Ceramic Swirl Chamber For Passenger Car Diesel Engine", by Yutaka Ogawa, et al, SAE Paper No. 870650, pp. 243-250.

Primary Examiner—Tony M. Argenbright
Attorney, Agent, or Firm—Roger L. May; Lorraine S. Melotik

[57] ABSTRACT

The invention discloses internal combustion engines, particularly compression ignition engines such as diesel engines, having reduced nitrogen oxide emissions with concurrent reductions in particulate emissions. The invention provides a catalyst impregnated prechamber insert which operates in the fuel rich environments of internal combustion engines to reduce nitrous oxides.

16 Claims, 3 Drawing Sheets

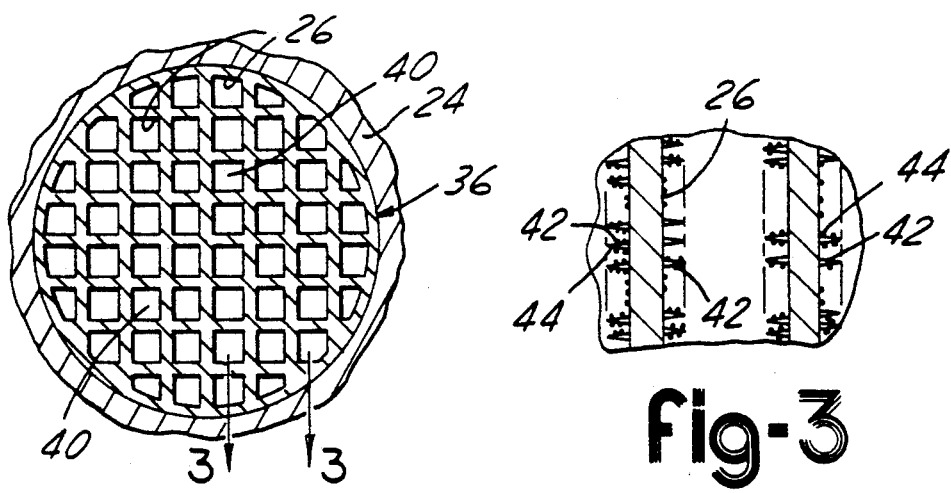
fig-2
fig-3
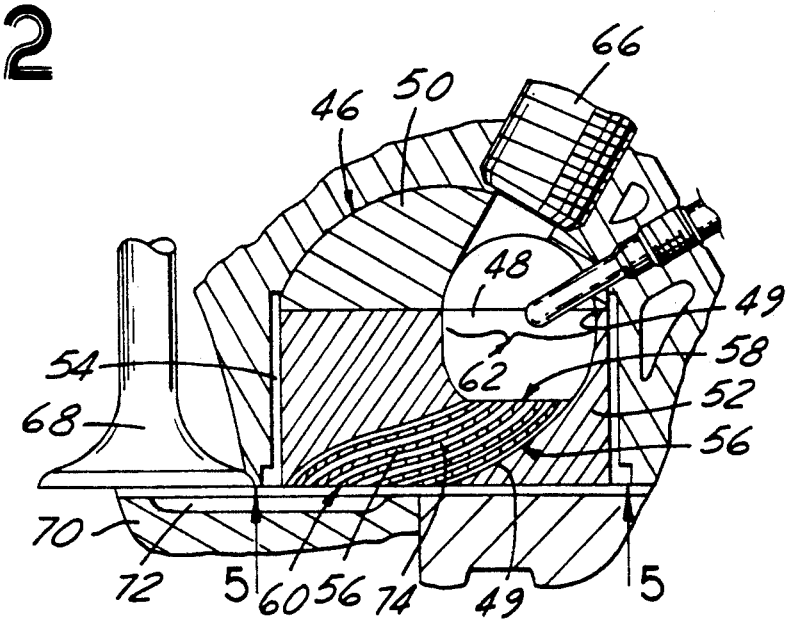
fig-4
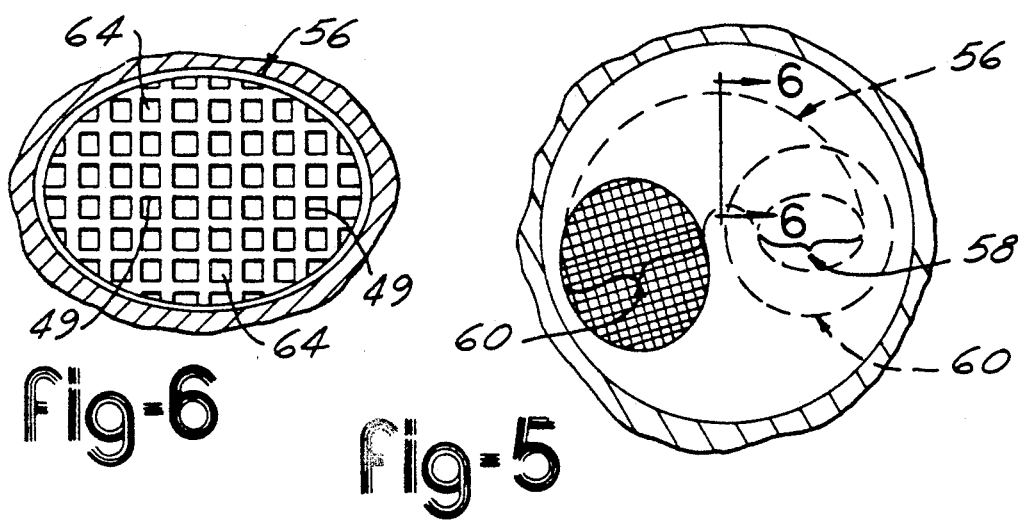
fig-6
fig-5

REDOX CATALYSIS OF $NO_x$ IN INTERNAL COMBUSTION ENGINES

TECHNICAL FIELD

This application generally relates to internal combustion engines having reduced nitrogen oxide emissions and particularly to the reduction of nitrogen oxide emissions in the exhaust of compression ignition engines and most especially diesel engines. It also relates to a catalyst impregnated pot or prechamber insert which operates in the fuel-rich environments of internal combustion engines to reduce nitrogen oxides.

BACKGROUND ART

Diesel engines have several advantages. Compared to traditional spark ignition engines, they generally have lower fuel consumption and a long service life. However, diesel engines have the disadvantage of producing emissions with significant concentrations of nitrogen oxides ($NO_x$) and particulates. The latter are generally manifested in the form of a black exhaust smoke or soot. Diesel engines also have a reputation for exhibiting significant noise and vibration during operation.

In recent years, the generation of $NO_x$ by internal combustion engines has been the focus of increasing government regulation. It is believed that nitrogen oxides contribute to tropospheric ozone, a health hazard, and also undergo a process known as photochemical smog formation in the presence of sunlight and hydrocarbons. Nitrogen oxides significantly contribute to the formation of acid rain have been implicated as contributing to the undesirable warming of the atmosphere or greenhouse effect. It is anticipated that allowable $NO_x$ emissions from motor vehicles will be significantly decreased in the coming years.

Unfortunately, however, attempts to reduce $NO_x$ emissions in diesel engines have generally resulted in only inadequate $NO_x$ reduction with a concurrent increase in particulate emissions. While $NO_x$ emissions in the exhaust streams of spark ignition engines have been reduced with the use of standard redox catalysts, the lean exhaust streams inherent in diesel engines preclude such use.

Other prior art techniques directed toward the reduction of $NO_x$ in combustion engine exhaust streams are unsuitable for use in motor vehicles. For example, U.S. Pat. No. 4,973,399 discloses a process in which nitrogen oxides contained in a flu gas resulting from the catalytic cracking of hydrocarbon were reduced with the use of a highly siliceous crystalline zeolite having a particular crystal structure, a silica to alumina ratio of 20 to 100, the zeolite containing both copper and rare earth cations. However, this process is dependent upon the use of a circulating inventory of solid acidic cracking catalysts and is inapplicable to the structure and cost restrictions inherent in motor vehicle design.

Several prior art patents attempt to decrease noxious combustion emissions by relying upon the reaction of ammonia with nitrogen oxides to produce nitrogen and water. U.S. Pat. No. 4,978,514 discloses a process for reducing nitrogen oxides in combustion outflow. The process requires introduction of ammonia or an ammonia precursor into the $NO_x$ containing effluent stream and the subsequent passing of the treated stream over a catalyst bed capable of reducing $NO_x$.

Similarly, U.S. Pat. No. 4,744,926 relies upon the addition of $NO_x$ to an ammonia containing stream prior to the stream's entry into a combustion zone and the subsequent production of nitrogen and water. Several characteristics make these processes inapplicable to use in commercial diesel powered vehicles. The on-board transport of a noxious chemical such as ammonia or an ammonia precursor and its continuous addition to an auto exhaust stream represent a potentially hazardous situation. In addition, these are complex processes which require careful regulation of experimental variables such as time, temperature and reactant concentration.

U.S. Pat. No. 4,886,650 proposes using the sublimation product of cyanuric acid to lower the $NO_x$ content of an exhaust gas stream. However, substantial amounts of this material would be required over the useful life of a diesel vehicle.

Thus, the prior art has failed to address the problem of diesel engine exhaust streams containing unacceptable levels of $NO_x$ and particulates. More specifically, the prior art has failed to reduce the $NO_x$ emission of internal combustion engines and compression ignition engines such as diesel engines without increasing particulate emissions.

SUMMARY OF THE INVENTION

The instant invention has addressed the deficiencies in the prior art by providing a diesel engine prechamber insert which utilizes a catalyst for reducing nitrogen oxides. The fuel-rich reducing atmosphere present in the prechamber pot after the injection of the fuel allows for the reduction and subsequent elimination of nitrogen oxides shortly after their formation in the high temperature prechamber.

The instant invention utilizes the inherent characteristics of compression ignition engines such as a diesel engine. The combustion process, which begins with the start of ignition, can be subdivided into two phases. In the 'premixed flame' phase, fuel which was injected prior to the start of ignition and mixed with air combusts. The fuel which is injected after the start of ignition combusts in a diffusion flame. The period between fuel injection and autoignition is defined as the ignition delay.

That portion of the combusted fuel which burns as a very rapid premixed flame is primarily responsible for the pressure increase and very high flame temperatures, and thus is a primary cause of combustion noise and the generation of nitrogen oxides. $NO_x$ formation is a function of oxygen concentration and flame temperature. During the premix precombustion period, the oxygen concentration is high; and depending on the amount of fuel present before the auto ignition, the flame temperature can be very high. The longer the ignition delay, the higher the flame temperature and a resultant increase in $NO_x$ formation.

The slower burning diffusion flame is the primary cause of soot and unburned hydrocarbons. Since the premixed flame phase occurs initially at the point of fuel injection and continues until auto ignition, the catalyst impregnated pot containing the air/fuel mixture can control or eliminate much of the $NO_x$ formed therein.

The invention is advantageous in that use of the apparatus disclosed herein will result in simultaneous decreases in $NO_x$ emissions, particulate emissions and cycle-to-cycle variability. Decreases in cycle-to-cycle variability result in significantly reduced noise, vibration and harshness and an overall increase in engine performance.

Those skilled in the art will appreciate that the same basic system is, of course, applicable to other internal combustion engines such as spark-assisted compression ignition engines as well as spark ignition gasoline engines operating under lean-burn conditions such as stratified charge engines.

It is, therefore, an object of the present invention to provide a diesel engine which has reduced nitrogen oxide emissions.

It is another object of the present invention to provide a diesel engine prechamber insert which results in an exhaust stream with significantly reduced concentrations of both $NO_x$ and particulates.

Accordingly, the present invention broadly relates to a diesel engine having reduced nitrogen oxide emissions where the engine has a piston and cylinder assembly having walls defining an enclosed variable displacement chamber which has a maximum volume when the piston moves from top dead to bottom dead center and a minimum volume when the piston is at top dead center, means for admitting air into the chamber when the piston is near bottom dead center, a compact pot formed in a wall of the variable displacement chamber, the pot having a surface which further defines the boundary of the chamber, means for injecting fuel into the compact pot when the piston is near top dead center and the end of the compression stroke to cause auto ignition and combustion of the resulting air and fuel mixture, and an effective amount of the catalyst applied to the surface of the pot for reducing nitrogen oxides formed in the combustion gases produced by combustion.

The invention further pertains to a diesel engine prechamber insert sized to fit within a prechamber pocket formed in the cylinder head and cooperating with a cylinder main chamber, the prechamber insert having a plurality of sections cooperating to form an external surface sized to fit within the cylinder head pocket and an interior surface defining an enclosed cavity in a throat extending from the cavity to the cylinder main chamber and a catalyst for reducing nitrogen oxides applied to the interior surfaces of the cavity and the throat.

BRIEF DESCRIPTION OF THE DRAWINGS

FIG. 2 is an enlarged cross-section view taken along the line 2—2 of FIG. 1.

FIG. 3 is an enhanced section view of the honeycomb throat taken along the line 3—3 of FIG. 4.

FIG. 4 is an alternative embodiment of the prechamber insert of the invention.

FIG. 5 is a cross-section view taken along the line 5—5 of FIG. 4.

FIG. 6 is an enlarged cross-section view taken along the line 6—6 of FIG. 5.

BEST MODE FOR CARRYING OUT THE INVENTION

Figure 1:
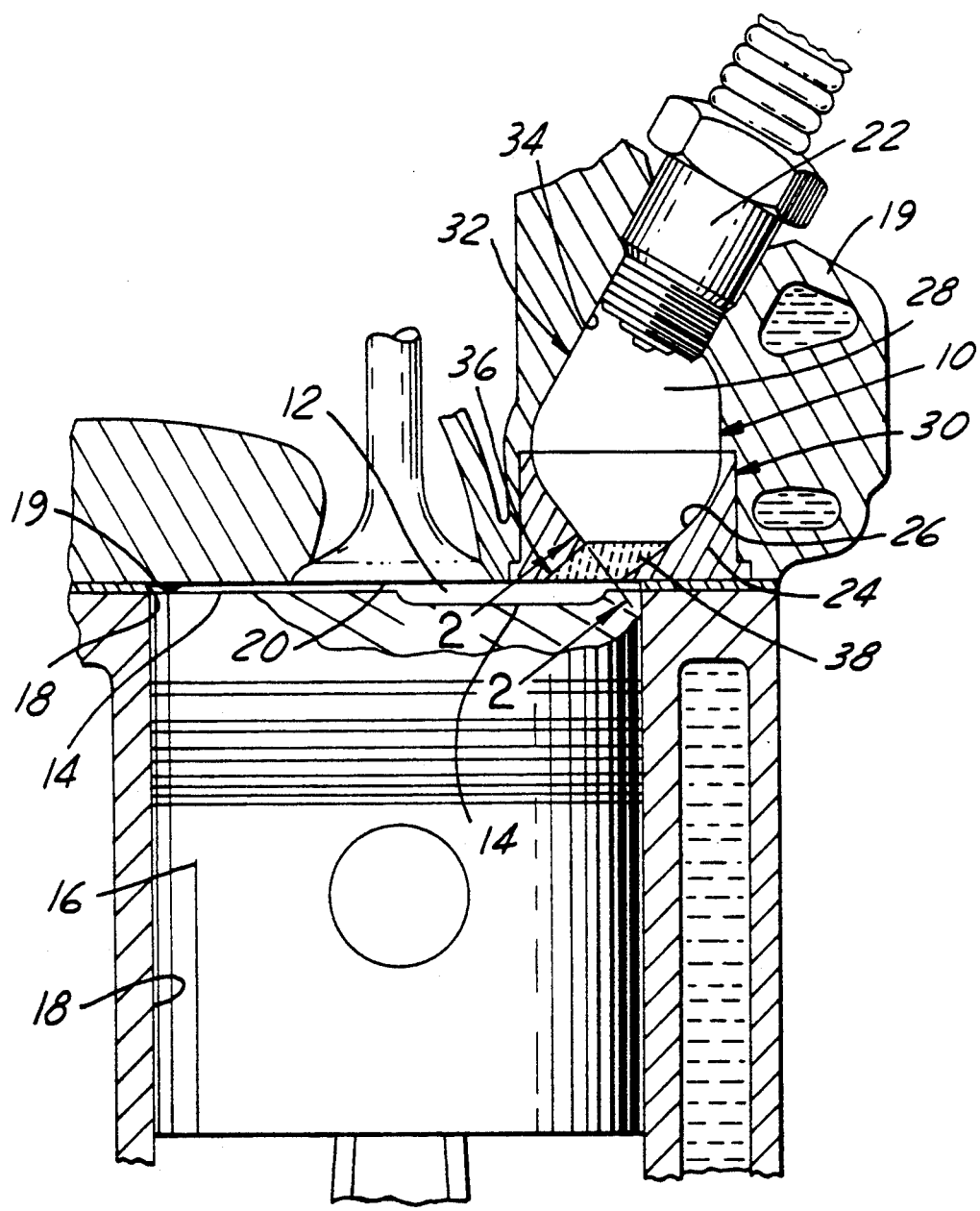
FIG. 1 is a cross-section view of the diesel engine of the invention.

The diesel engine of the instant invention achieves concurrent reductions in both $NO_x$ and particulate emissions as well as significant improvements in noise, vibration and harshness during engine operation. These benefits are achieved with the use of a catalyst impregnated pot which defines a portion of the boundary of an enclosed variable displacement or combustion chamber.

This catalyst impregnated pot affects the combustion cycle and exhaust production in three ways. First, $NO_x$ are produced during the premixed flame phase which occurs after the injection of fuel and before ignition. Ignition is herein defined as a significant increase in the pressure of the chamber attributable to combustion. This portion of the combustion process is primarily responsible for $NO_x$ generation. With the use of the catalyst impregnated pot defining a portion of the combustion chamber and the resultant shortening of the ignition delay period, $NO_x$ are reduced and substantially eliminated almost as soon as they are generated.

Second, when the pot is impregnated with a redox catalyst, oxidation and hence elimination of soot and unburned hydrocarbons will be promoted as the air/fuel ratio of the air/fuel mixture becomes increasingly lean. This occurs as the air/fuel mixture enters or expands into the main combustion chamber.

Third, ignition delay, which has been earlier defined as the time between the injection of the fuel and ignition, is decreased. While not wishing to be bound by any particular theory, it is believed that this benefit is attributable to the non-homogeneous character of the air/fuel mixture, particularly in the prechamber pot. It is believed that higher concentrations of air present along the chamber environment/pot surface boundary layer cause the adsorption of hydrogen and oxygen onto the cacatalyst surface. It is believed that when the pot is impregnated with a redox catalyst, oxidation dominates in this boundary layer to cause the release of heat with the breaking of chemical bonds. The resultant increase in heat energy is believed to contribute to ignition and hence a decrease in the ignition delay.

This decrease in ignition delay results in a reduced pressure and flame temperature during premix combustion and hence a decrease in noise. Characteristics such as diesel knock, noise, vibration and harshness during operation are diminished as a result of a decrease in ignition delay.

While the catalyst impregnated pot may be used in both DI and IDI diesel engines, it is most preferred that the catalyst impregnated pot of the instant invention be used in IDI engines. Those skilled in the art will appreciate that the air/fuel ratio in the prechamber or swirl chamber of an IDI diesel engine provides a fuel-rich atmosphere conducive to achieving the benefits of the instant invention.

However, it will be appreciated that the catalyst impregnated pot of the instant invention will also function in DI diesel engines due to the initially high concentration of the fuel upon injection and the fact that it is the premixed flame phase of combustion prior to ignition which is primarily responsible for $NO_x$ formation. However, in addition to compression ignition engines such as DI and IDI diesel engines, the instant invention is also applicable to internal combustion engines such as spark assisted compression ignition engines and lean-burn spark ignition gasoline engines. For these engines a larger prechamber volume and a larger catalyst surface area are available due to reduced compression ratios. With the exception of the spark ignition gasoline engine which is illustrated in FIG. 9 and will be discussed below, the following discussion with respect to diesel engines is considered to be applicable to internal combustion engines such as the spark assisted compression ignition engines.

Turning now to the figures, it will be seen that FIG. 1 illustrates an IDI diesel engine utilizing the catalyst impregnated pot of the instant invention as prechamber 10. A variable displacement chamber 12 is defined by the head 14 of piston 16, the cylinder 18, air intake manifold 20, cylinder head 19, and prechamber 10.

Those skilled in the art will appreciate that variable displacement chamber 12 will have a minimum volume when piston 16 is at top dead center (TDC) in cylinder 10 as illustrated in FIG. 1. Chamber 12 will have a maximum volume when piston 16 is at the bottom of its travel or bottom dead center (BDC).

Fuel enters the prechamber pot 10 via fuel injection means 22. Those skilled in the art will appreciate that the prechamber 10 could further comprise a glow plug for cold engine starts.

The prechamber 10 illustrated in FIG. 1 will be comprised of a substrate material 24, the interior surface 26 of which will be impregnated with a catalyst as described below. While the substrate material 24 may be comprised of ceramic, metal or combinations thereof, the substrate must be porous. It will be appreciated by those skilled in the art that the prechamber 10 which defines the prechamber cavity 28 may consist of the prechamber insert 30 in conjunction with the recessed portion 32 of cylinder head 19. It is anticipated that the interior surface 34 of recessed portion 32 will not be impregnated with the catalyst unless the surface is porous.

Although it is within the scope of this invention to have a prechamber cavity 28 which is partially defined by the recessed portion 32 of cylinder head 19, it is most preferred that as large a portion as possible of the prechamber cavity 28 be defined by a porous material such as ceramic. While those skilled in the art will appreciate that a metal substrate having a porous ceramic coating thereon can comprise the substrate 24, it is most preferred that substrate 24 of FIG. 1, be comprised of a porous ceramic.

Prechamber cavity 28 is joined to the variable displacement chamber 12 by throat 36. Throat 36 will preferably have a honeycomb structure providing a plurality of cells 40 illustrated in FIG. 2. Preferably, the throat 36 will have a honeycomb structure providing from 50 to 400 cells per square inch. Most preferably, a honeycomb structure having from 200 to 300 cells per square inch will be utilized.

Suitable ceramic materials will have thermal resistance to combustion temperature, and a high thermal shock resistance to cold engine operation, sufficient mechanical strength and low thermal diffusivity. Suitable ceramics include silicon carbide and silicon nitride. While other types of ceramics such as lithium aluminum silicate and partially stabilized zirconia, stabilized aluminum titanate, and mullite may be suitable, it has been found that silicon nitride and silicon carbide are most likely to yield the desired strength and durability characteristics.

Suitable silicon nitride substrates will be those fabricated by the injection molding of silicon mixed with a thermoplastic organic binder and then baked followed by nitriding in a 1.8% $H_2 + N_2$ nitriding atmosphere. See J.A. Mangels, *Creep-Resistant Reaction Sintered $Si_3N_4$, CERAMICS FOR HIGH PERFORMANCE APPLICATION*, Chap. 9, published by Metals & Ceramics Information Center; Columbus, Ohio (1974), pp. 195–205 herein incorporated by reference. Nitriding cycles of 36 hours at 2300° F. followed by 24 hours at 2600° F. have been found to be most preferred. Suitable silicon nitride ceramics that have been completely nitrided will have similar phase compositions of approximately 65 wt. % a $Si_3N_4$ and 35 wt. % $Si_3N_4$.

The degree of purity of the silicon nitride has been found to affect creep rates at elevated temperatures. It appears that by increasing the purity of the materials with respect to calcium and aluminum, a greater creep resistance can be realized. Accordingly, the most preferred silicon nitrides will be those having calcium contents of less than 0.05% by weight and most preferably less than or equal to 0.02% by weight, which have been reprocessed in a nitriding atmosphere as described above. Silicon nitrides as disclosed above are reported to be capable of operating at temperatures of 2300° F. and a stress of 10,000 psi for at least 200 hours while undergoing less than half of a percent creep strain. In addition, the silicon nitride as discussed above has been found to be particularly advantageous due to the formation of a silicon nitride whiskers believed to be a result of the aforementioned nitriding process. It is believed that these a silicon nitride whiskers are responsible for excellent surface area stability up to 2400° F. See SAE Paper #850553, *High Temperature Substrate and Catalyst System* by V. Durga Nageswar Rao Feb./Mar. 1985, herein incorporated by reference. As illustrated in Table 1 catalyst supports with α silicon nitride whiskers demonstrate improved surface area stability as measured against a γ alumina washcoat.

TABLE 1

BET SURFACE AREA OF SUBSTRATES WITH α-SILICON NITRIDE WHISKERS AND γ-ALUMINA WASHCOAT AFTER 1500° F., 2200° F., AND 2400° F. AGING

| Catalyst Support | BET Surface Area: $M^2$/gm | | | |
|---|---|---|---|---|
| | Room Temp | 1500° F. 24 hrs. | 2200° F. 17 hrs. | 2400° F. 14 hrs. |
| γ-$Al_2O_3$ Reference (Baseline) | 17 | 13 | 9.6 | 1.4 |
| α-Whiskers ($Si_3N_4$) | 6.8 | 7.2 | 6.8 | 6.8 |

Turning to FIG. 3, an enhanced view of a portion of the throat 36 of FIGS. 1 and 2 is shown. As illustrated in FIG. 3 the α-silicon nitride whiskers are whisker like protuberances 42 extending outwardly from the surface 26 of the cavity 28, the throat 36 and cells 40. These whiskers 42 extend outwardly from the entire exposed surface of the prechamber of the instant invention and act to increase the available catalytic surface area.

The whiskers 42 will preferably have a diameter approximately 0.05 to 0.2 microns and will most preferably have a diameter of 0.1 microns. The length the whiskers 42 will preferably be from 5 to 30 microns and will most preferably be from 10 to 12 microns. As illustrated in FIG. 4, catalyst particles 44 are on the whiskers 42 as well as the surface 26.

Suitable catalysts for incorporation into the instant invention are those which are capable of reducing nitrogen oxide under reducing conditions such as a fuel-rich atmosphere. Most preferably, the catalysts used herein will be redox catalysts which are capable of reducing nitrogen oxides in atmospheres having an air/fuel ratio of less than or equal to stoichiometric but also capable of promoting the oxidation of hydrocarbons at air/fuel ratios greater than stoichiometric. Suitable catalysts will be selected from the group consisting of the noble metals, the transition metals, the rare earth elements and combinations thereof. Of the noble metals, platinum, palladium, and rhodium are preferred and rhodium is most preferred. Of the transition metals the oxides of copper and nickel are most favored. Cerium is the most preferred of the rare earth metals. The most preferred catalyst will have at a minimum, rhodium and either copper or nickel.

The catalyst of the instant invention should be present in an amount equal to 10 to 75 grams per cubic foot of the physical volume of the catalyst substrate. Preferably, the catalyst will be present on the surface of the prechamber pot, including the throat, in an amount from 10 to 50 grams per cubic foot and most preferably, 20 grams per cubic foot. The catalyst impregnated pot of the instant invention may be impregnated with the catalyst using conventional techniques such as immersion followed by drying and calcining.

The concurrent reduction of both $NO_x$ and particulates will be best achieved with the use of the preferred embodiment illustrated in FIG. 4. Note that the prechamber insert 46 in FIG. 4 completely defines the prechamber cavity 48. Most preferably, the diesel engine prechamber insert of the instant invention will have a prechamber cavity completely defined by a prechamber insert as illustrated in FIG. 4. That is, most preferably the entire cavity 48 will be defined by the surface 26 of insert 46. This compares to the embodiment of FIG. 1 wherein the cavity 28 is partially defined by the insert 30 and partially by recessed portion 32 of cylinder head 19.

Most preferably, the prechamber insert 46 will have a multipiece construction as illustrated in FIG. 4 and as discussed in SAE Paper #870650, "Complete Ceramic Swirl Chamber For A Passenger Car Diesel Engine" by Ogawa et al. which is herein incorporated by reference. The multipiece ceramic prechamber having separate but cooperating upper half 50 and lower half 52 is preferred because accurate dimensions are required for the prechamber 46 in order to ensure reduction of particulates. The shrinking ratio of green ceramics in the firing process is nearly 20% and it is difficult to keep dimensional accuracy. It has been found convenient to control the dimensional accuracy in more than a monolithic piece. In addition, the multipiece prechamber insert 46 is thought to be better than the monolithic chamber at reducing thermal stress concentrations. Multipiece prechambers should be designed so as to reduce thermal stress, provide good clamping, and provide a heat insulation air gap.

Upper and lower halves 50 and 52 may be encased by metal sleeve 54. Most preferably, the ceramic prechamber 46 of FIG. 4 will be comprised of silicon nitride as discussed above.

It is most preferable that the throat of the catalyst impregnated prechamber pot of the invention have a construction as illustrated by throat 56 in FIGS. 4, 5 and 6. As illustrated in FIG. 4, throat 56 will be elongated with a length from 2 cm to 7 cm. Most preferably, the entrance diameter 58 of throat 56 will be greater than that of the exit diameter 60. In FIGS. 4 and 5, it can be seen that the exit diameter 60 is greater than the entrance diameter 58. Most preferably, the exit diameter 60 will be equal to the diameter 58 of the prechamber cavity 48.

Preferably, the throat 56 will have a cellular construction providing a plurality of cells. Most preferably, the throat 56 will have a honeycomb structure as illustrated in FIG. 6 providing cells 64. In conjunction with the whiskers discussed above, it is most preferred that the overall BET surface area of the prechamber and the throat be from $2M^2$/gram to $7M^2$/gram.

It will be appreciated that as the air/fuel mixture created by the injection of fuel from fuel injection means 66 and the compression of the air admitted by air intake manifold 68 by the upward movement of piston 70, combusts, the air/fuel mixture will move from the prechamber cavity 48 to the variable displacement chamber 72. It will be appreciated that the air/fuel ratio in the prechamber cavity 48 will be from 14 to 6 and most preferably from 8 to 6. The air/fuel ratio in the middle region 74 of the throat 56 will be from 14 to 80. It is anticipated that the air/fuel ratio in the variable displacement chamber 72 will be from 80 to 20 assuming idle to heavy speeds loads. For a spark assisted CI engine and lean-burn gasoline engine this last valve will be around 14 to 25.

Accordingly then, if the prechamber surface 49 is impregnated with a redox catalyst, oxidation of uncombusted or partially combusted hydrocarbon particles will be promoted in the region 74 of the throat 56. Thus, increasing the length of the path which the air/fuel mixture must travel and be in contact with the impregnated catalyst, facilitates the production of an exhaust having lower concentrations of both $NO_x$ and particulates. A large throat exit diameter 60 relative to throat entrance diameter 58 facilitates the transference of the air/fuel mixture from prechamber cavity 48 to variable displacement chamber 72 as well as increasing available surface area for a reaction between the catalyst impregnated surface 49 and the $NO_x$ and particulates containing gas stream.

Figure 7:
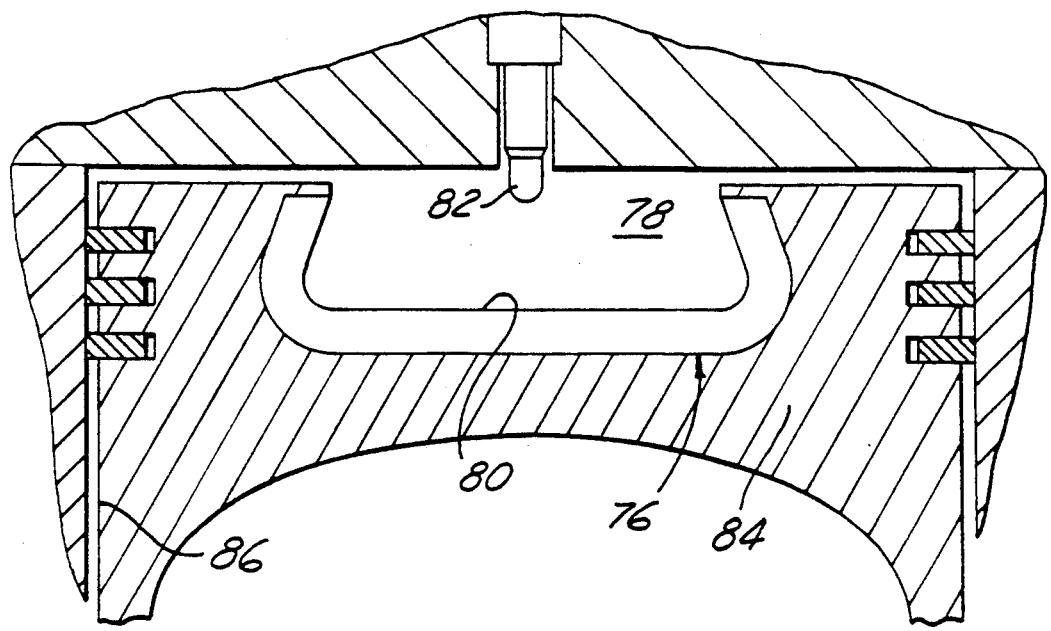
FIG. 7 is an alternative embodiment showing the invention as applied to a direct injection (DI) diesel engine.

While it will be appreciated that the highly fuel rich atmosphere of a prechamber pot of an IDI diesel engine facilitates reduction of $NO_x$ by catalyst impregnated therein, it is anticipated that the instant invention may be successfully utilized in a DI diesel engine by virtue of the initially high fuel concentration existing upon injection. FIG. 7 illustrates a DI embodiment. The catalyst impregnated pot 76 defines the boundaries of the variable displacement chamber. Pot 76 is with piston 84 which travels between TDC and BDC within cylinder 86. Catalyst impregnated surface 80 will be preferably comprised of a porous ceramic material as described above and impregnated with the redox catalyst as described above. Fuel will be injected by fuel injection means 82.

Figure 8:
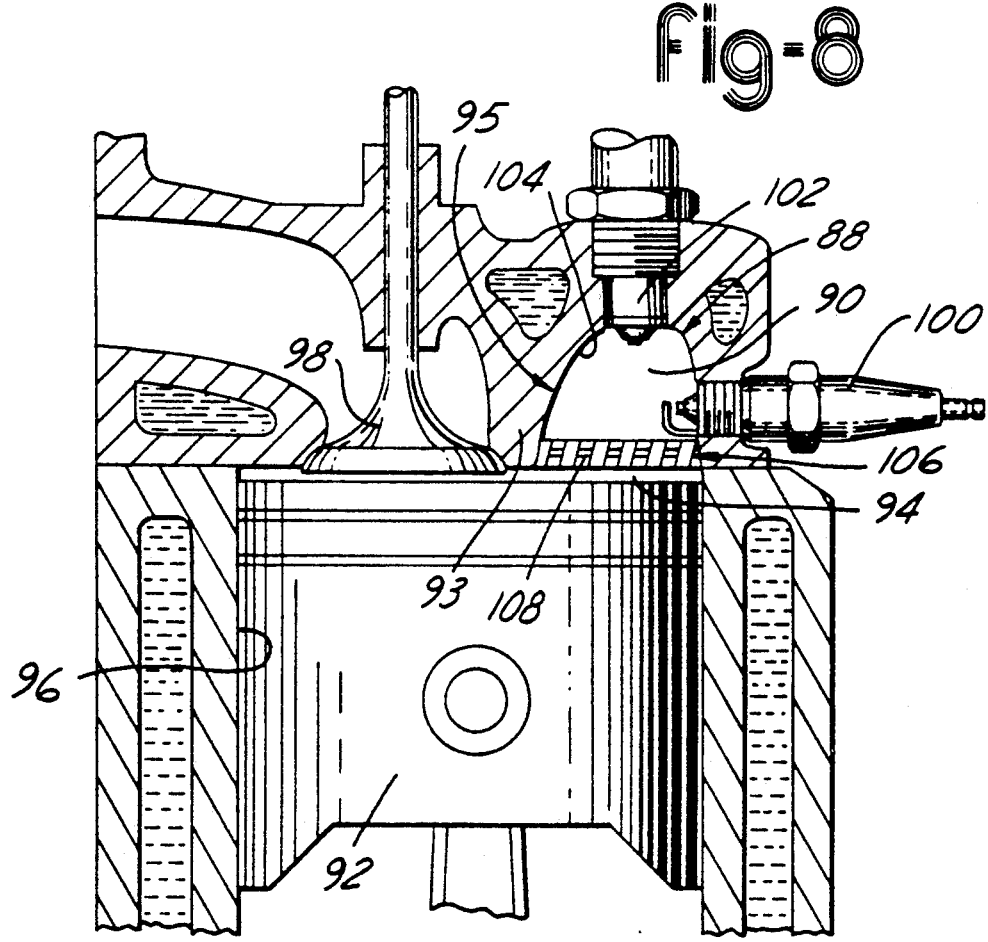
FIG. 8 is an alternative embodiment showing the invention as applied to a gasoline engine.

Finally, FIG. 8 illustrates the application of the catalyst impregnated prechamber pot to a spark assisted gasoline lean-burn engine. Prechamber 88 defines the prechamber cavity 90 and is formed by the recessed portion 95 of cylinder head 93. Prechamber cavity 90 is connected to a variable displacement chamber 94 by throat 106. Variable displacement chamber 94 is defined by piston 92, cylinder 96, air intake manifold 98 and cylinder head 93. Fuel is injection by means of fuel injector 102 and is ignited by spark plug 100. The combusted air/fuel mixture expands and exits the prechamber cavity 90 through throat 106 to variable displacement chamber 94 pushing piston 92 to its bottom dead center position.

It will be appreciated that throat 106 and the surface 95 are preferably comprised of a porous ceramic as described above and are most preferably comprised of a nitrided silicon nitride as discussed above. The catalysts are likewise as disclosed in reference to the compression ignition engine.

It will be appreciated by those skilled in the art that there are many possible constructions of the catalyst impregnated prechamber pot described above.

While the best modes for carrying out the invention have been described in detail, those familiar with the art to which the invention relates will recognize various alternative designs and embodiments for practicing the invention as defined by the following claims.

We claim:

1. An internal combustion engine having reduced nitrogen oxide emissions, comprising:
    a piston and cylinder assembly, said piston and cylinder assembly having walls defining an enclosed variable displacement chamber which has a maximum volume when the piston is at bottom dead center and a minimum volume when the piston is at top dead center;
    means for admitting air into the chamber;
    a compact pot formed in a wall of the variable displacement chamber, and having a surface which partially defines a boundary of the chamber;
    means for injecting fuel into the pot when the piston is near top dead center to cause ignition and combustion of the resulting air and fuel mixture;
    a plurality of whisker-like protuberances extending outwardly from the surface of the compact pot; and
    an effective amount of a catalyst applied to the surface of the pot and to the whisker-like protuberances for reducing nitrogen oxides formed in the combustion gases produced by the combustion.

2. The engine of claim 1 wherein the piston and cylinder assembly further comprises a cylinder head attached to the cylinder, the cylinder head having a wall which defines a boundary of the variable displacement chamber, wherein the compact pot is a prechamber formed in said wall.

3. The engine of claim 1 wherein the pot is comprised of a material selected from the group consisting of ceramic, metal and combinations thereof.

4. The engine of claim 2 wherein the pot is comprised of a ceramic.

5. The engine of claim 4 wherein the pot is comprised of a ceramic selected from the group consisting of silicon nitride and silicon carbide.

6. The engine of claim 1 wherein the catalyst is selected from the group consisting of noble metals, transition metals, rare earth elements, and combinations thereof.

7. The engine of claim 6 wherein the catalyst comprises the combination of rhodium and a transition metal selected from the group consisting of copper and nickel.

8. The engine of claim 6 wherein the catalyst is a redox catalyst capable of oxidizing hydrocarbons.

9. The engine of claim 1 wherein an effective amount of the catalyst is from 10 to 75 grams per cubic foot of physical volume of the catalyst substrate.

10. A diesel engine which generates combustion gases having reduced nitrogen oxides, comprising:
    a piston and cylinder assembly, said piston and cylinder assembly defining an enclosed variable displacement chamber which has a maximum volume when the piston is at bottom dead center and a minimum volume when the piston is at top dead center;
    means for admitting air into the chamber;
    a silicon nitride prechamber formed in a wall of the variable displacement chamber and having a surface which partially defines a boundary of the chamber and having a plurality of whisker-like protuberances extending outwardly from the prechamber surface;
    means for injecting fuel into the prechamber when the piston is near top dead center to cause autoignition and combustion of the resulting air and fuel mixture;
    an effective amount of a redox catalyst applied to the surface of the prechamber and the protuberances extending therefrom for reducing nitrogen oxides formed in the combustion gases produced by the combustion.

11. The engine of claim 10 wherein the catalyst promotes the oxidation of hydrocarbons.

12. A diesel engine prechamber insert sized to fit within a prechamber pocket formed in a cylinder head and cooperating with a cylinder main chamber, comprising:
    a plurality of sections cooperating to form an external surface sized to fit within the cylinder head pocket and an interior surface defining an enclosed cavity and a honeycombed throat extending from the cavity to the cylinder main chamber;
    a plurality of whisker-like protuberances extending outwardly from the interior surface of the cavity and the honeycombed throat; and
    a catalyst applied to the interior surfaces of the cavity and the throat for reducing nitrogen oxides.

13. The prechamber of claim 12 wherein the throat has a cellular structure.

14. The prechamber of claim 13 wherein the sections are comprised of silicon nitride.

15. The prechamber of claim 12 wherein the catalyst is selected from the group consisting of noble metals, transition metals, rare earth elements, and combinations thereof.

16. The prechamber of claim 15 wherein the catalyst is further capable of oxidizing hydrocarbons.

* * * * *